United States Patent [19]

Boivie et al.

[11] Patent Number: 4,633,041

[45] Date of Patent: Dec. 30, 1986

[54] STATION SET DIRECTORY ASSISTANCE ARRANGEMENT

[75] Inventors: Richard H. Boivie, Middletown; Alexander Feiner, Rumson; Michele S. Rabinowitz, Middletown; Rickens T. Szeto, Eatontown; Barry J. Weinbaum, Ocean, all of N.J.

[73] Assignee: AT&T Information Systems Inc., Middletown, N.J.

[21] Appl. No.: 598,497

[22] Filed: Apr. 9, 1984

[51] Int. Cl.⁴ .................... H04M 1/276; H04M 1/56; H04M 3/50
[52] U.S. Cl. .................................... 379/354; 379/355
[58] Field of Search ........... 179/18 B, 27 FH, 27 FG, 179/90 BD, 90 B, 90 BB, 90 AN, 84 VF, 18 BA

[56] References Cited

U.S. PATENT DOCUMENTS

| | | | |
|---|---|---|---|
| 3,932,709 | 1/1976 | Hoff et al. | 179/90 K |
| 4,005,388 | 1/1977 | Morley et al. | 364/200 |
| 4,341,929 | 7/1982 | Alexander et al. | 179/90 B |
| 4,475,013 | 10/1984 | Lee et al. | 179/90 BD |

OTHER PUBLICATIONS

"Alphabetic Data Entry Via the Touch-Tone Pad: A Comment", S. L. Smith and N. C. Goodwin, *Human Factors*, 1971, vol. 13(2), pp. 189–190.
"Name-Address and Sort Program", G. A. Slotts, *Interface Age*, Nov. 1980, pp. 81–82, 140–141.
"Programming Pearls, Problem 5", *Communications of the ACM*, Sep. 1983, vol. 26, No. 9, p. 626.

Primary Examiner—Thomas W. Brown
Attorney, Agent, or Firm—Frederick B. Luludis

[57] ABSTRACT

A stored directory is searched from a display station set to obtain the telephone number of a sought-after name. The arrangement uses the station set keypad to generate signals corresponding to the spelling of the sought-after name. The arrangement adds each entry it receives to previously formed sequence of entries and, for each newly formed sequence, returns to the station set the name and telephone number contained in a directory record having a string of characters that compare to the newly formed sequence. The arrangement also provides means for scrolling through the directory.

18 Claims, 8 Drawing Figures

FIG. 3

| DIRECTORY | | |
|---|---|---|
| KEYPAD EQUIVALENT | NAME | EXTENSION |
| 24589250427346, | AHLUWAL,HARDIN | 3329 |
| 255766023057, | ALLSON,CC,JR | 3686 |
| 2375693290373337, | BERKOWECZ,FREDER, | 3748 |
| 2375693290728504, | BERKOWECZ,PAUL G, | 3175 |
| 2648430742427304, | BOIVIE,RICHARD H, | 3961 |
| 33463702, | FEINER,A, | 3290 |
| 472634076625808, | GRANGE,RONALD J. | 3402 |
| 467360564605, | HOREN,JOHN J. | 3312 |
| 6453705684703, | MILES,LOUIS E. | 3209 |
| 7224669489064243, | RABINOWITZ,MICHE, | 3714 |
| 7424273042779, | RICHARD,HARRY, | 3961 |
| 742427373602326, | RICHARDSEN,ADAM | 3060 |
| 7424273736078383, | RICHARDSEN,STEVE, | 3558 |
| 7482485025373306, | SHUBIAK,ALFRED M, | 3755 |
| 7938607425367082, | SZETO,RICKENS TA, | 3233 |
| 9346228602277905, | WEINBAUM,BARRY J, | 3213 |

4,633,041

STATION SET DIRECTORY ASSISTANCE ARRANGEMENT

FIELD OF THE INVENTION

The invention relates to arrangements for providing directory assistance at a telephone station set.

BACKGROUND OF THE INVENTION

Users of business customer systems access a system operator or consult a printed telephone directory to obtain a desired telephone number. Alternatively, automatic directory assistance can be provided locally at the station set using a microcomputer having the capacity to store several hundred directory entries. An example is the memory access system disclosed in U.S. Pat. No. 4,341,929 issued to R. D. Alexander et al on Mar. 20, 1980. The Alexander et al device is accessed by inputting a name via an alphanumeric keyboard. A microprocessor accumulates the inputs and displays the name and assigned telephone number upon matching the inputted entries with one of the records stored in memory. A problem arises since it is quite expensive to provide such equipment at each station set. Moreover, it would be almost as expensive to provide an alphanumeric keyboard at each station for the purpose of providing centralized automatic directory assistance.

Accordingly, alternative arrangements have been devised to permit a user to operate a telephone type keypad as an alphanumeric keyboard. For example, operating the second keypad button is normally recorded as the number 2, however, if the star (*) button is operated prior to operating the second button then the letter A is recorded. If either the 0 or pound (#) button is operated prior to operating the second button, then the letter B or letter C is recorded, respectively.

An example of using a station set keypad in an alphanumeric mode is disclosed in U.S. Pat. No. 4,005,338 issued to R. R. Morley et al on Jan. 25, 1977. The Morley et al arrangement uses three additional buttons in place of the *, 0 and # buttons for differentiating between the letters assigned to a keypad button.

Using either of the above-mentioned keypad schemes in a station set directory assistance arrangement would be cumbersome, since inputting each letter of a sought after name requires the user to operate two keypad buttons. Also, failure to operate a button to differentiate between a group of letters, for example, the letters A, B and C, could cause the system to display the wrong telephone or station set extension number if such a failure results in a default to the first letter of the group.

An article entitled "Alphabetic Data Entry Via the Touch-Tone Pad: A Comment" by S. L. Smith and N. C. Goodwin, appearing at pages 189-190 of *Human Factors*, Vol. 13(2), April 1971, describes the use of a keypad pad for name inputting to a computer. A problem arises in using the Smith-Goodwin arrangement because all number coded letters of a name need to be inputted in order to receive a response from the arrangement. Thus, a user would be faced with an inordinate delay before receiving a response when inputting the number coded letters of a long name.

SUMMARY OF THE INVENTION

The invention obviates the problems associated with the prior art by providing a response to each entry, as it is inputted by a station set user using the station set keypad. As each digital coded letter of a sought-after name is entered, it is added to a sequence of previously inputted entries. Each newly formed sequence is then compared with the leading substring of characters contained in each record of a stored directory. When a match is found, the information field (containing the sought-after name and telephone number) of the matching record is returned to the user. Thus, in most instances, the sought-after name and telephone number are returned to the user prior to the user inputting all of the digit encoded letters of the name being input. This means that the user can often find a name without keying the entire name and the user can often find a name without knowing the complete spelling.

In accordance with another aspect of the invention, the user is provided the capability to scroll through the directory to resolve any ambiguities that may be associated with the sought-after name, for example, the ambiguity that arises when the same surname appears several times in the stored directory.

BRIEF DESCRIPTION OF THE DRAWING

The operation and implementation of the present invention will be more fully apparent from the following description and accompanying drawing in which:

FIG. 3 shows the layout of a stored directory within the communication system of FIG. 1, the directory having a plurality of directory records;

SYSTEM OVERVIEW

Figure 1:
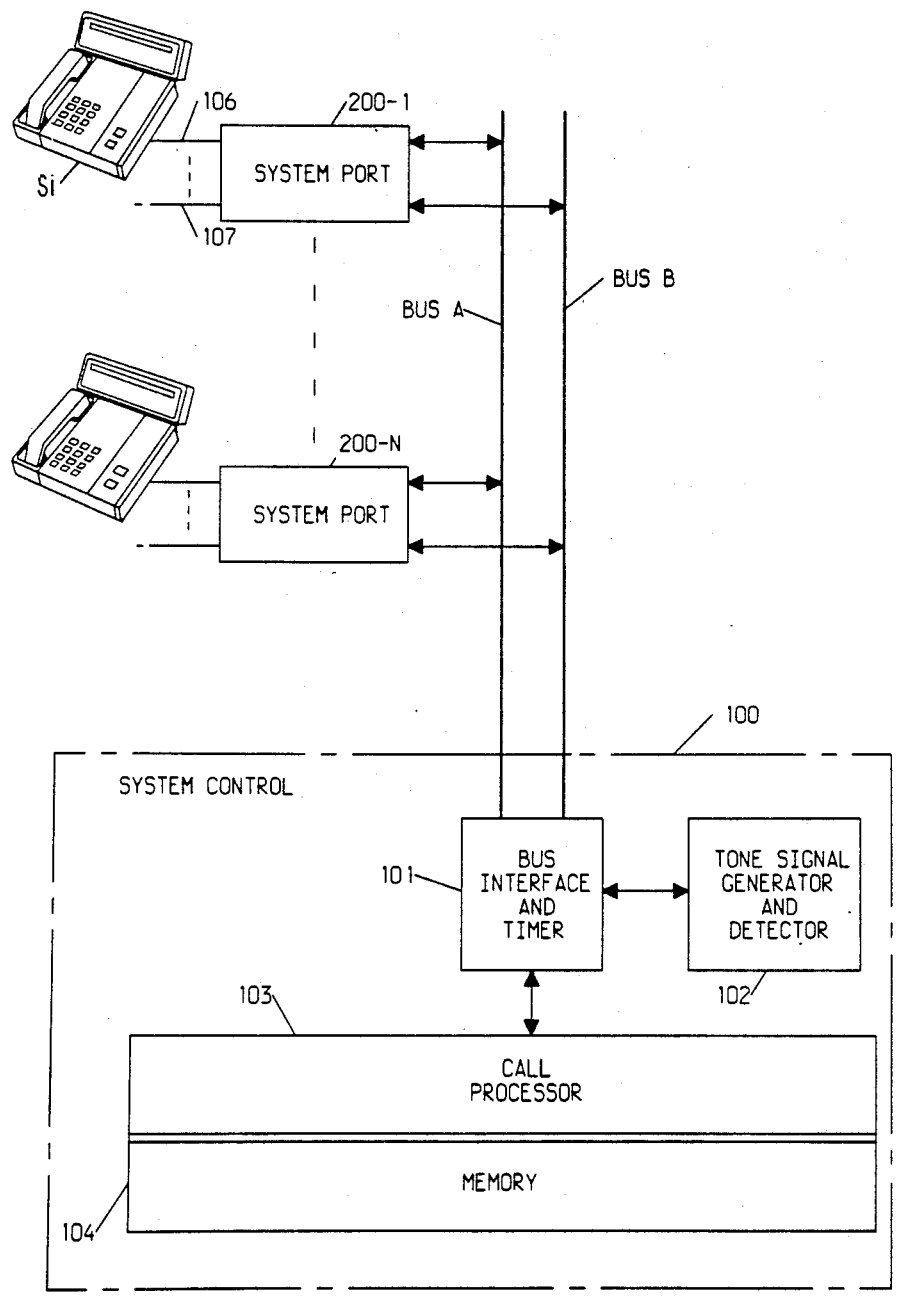
FIG. 1 is a block diagram of a communication system in which the invention is advantageously used.

FIG. 1 shows a block diagram of a stored-program-controlled business communication system which combines the usual system features with the present invention. Control is distributed among a plurality of system ports 200-1 through 200-N, with each system port, such as systems port 200-1, serving a number of terminals, such as station S1. The system ports, in turn, are served by a digital bus system, having bus A and bus B and a common system control 100. The system control has bus interface and timer 101, call processor 103 and tone source signal generator and detector 102. System bus A and system bus B are time division multiplexed busses, each having 256 time slots. Interface 101 is used to interface call processor 103 to system bus A and bus B. The manner in which these system elements operate and interact is disclosed in U.S. Pat. No. 4,389,720 issued to L. A. Baxter et al, which is hereby incorporated by reference. Briefly, the system shown handles voice signals, as well as data, between the various stations. Tone source signal detector 102 detects digit tones inputting by a station set, such as station set S1. Processor 103 provides control information to the system ports indicative of the time slots assigned to a particular station.

Associated with call processor 103 is memory 104 in which is stored the program which directs the operation of the system. Memory 104 also contain records associated with each station, such as station S1. Stimuli, such as digit tones and supervisory signals, received from station S1 are stored in its assigned station record. The station record is used by processor 103, operating in conjunction with the stored program, to track the functional status of station S1 upon receiving a new stimulus therefrom.

Figure 2:
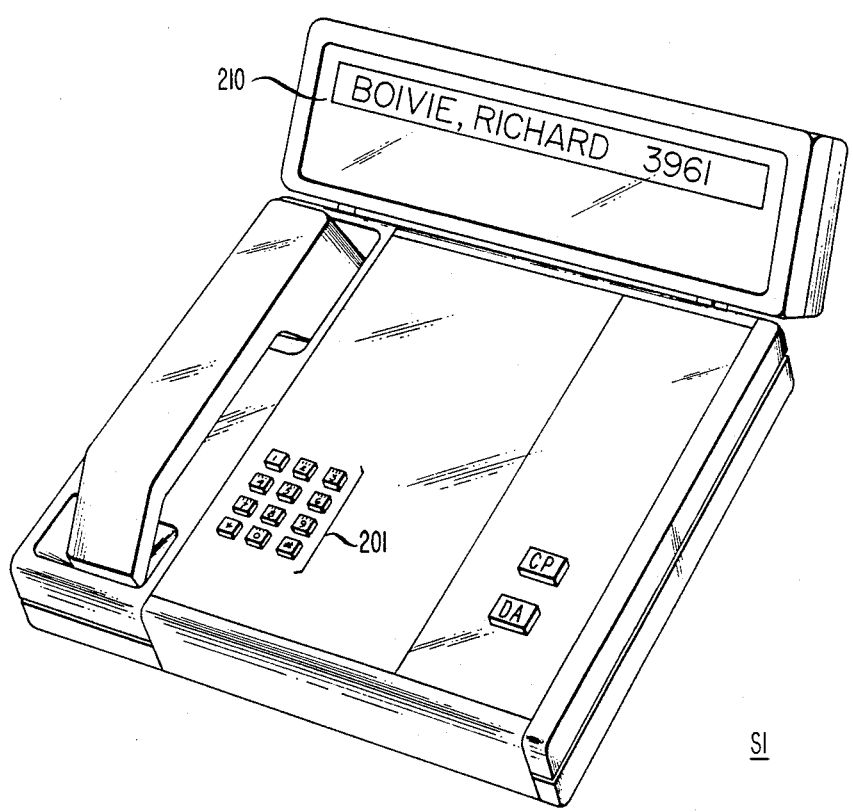
FIG. 2 is a pictorial view of a station set with a display module attached, that is illustratively used in the system of FIG. 1.

Station S1 shown in FIG. 1 has been expanded in FIG. 2 to show the station elements more clearly. Keypad 201 is a telephone keypad having a plurality of buttons for generating signals representative of the digits 1 to 0, the star (*) sign and the pound (#) sign. Further, each of the digits 2 to 9 is associated with a particular group of three letters printed on the respective button. Also associated with station S1 is display module 210 which displays information, such as the name or telephone number of a calling station, received from associated port 200-1. Station S1 is of the type disclosed in copending application to Nici et al of Ser. No. 464,058, filed Feb. 4, 1983, now U.S. Pat. No. 4,512,017, which is hereby incorporated by reference as if fully disclosed herein.

Station S1 also includes at least the standard repertoire of feature buttons for invoking station features, such as "hold", "conference", etc. (not shown in FIG. 2). Also, included in the array of feature buttons is the directory assistance feature button "DA" used for invoking the invention claimed herein. FIG. 2 also shows the CP button (call placement) which allows the user to automatically place a call to the displayed station number.

SYSTEM DETAILS

Referring now to FIG. 3, there is shown a directory which is stored in a portion of memory 104. Each record of the directory consists of three fields of information: keypad equivalent, name and telephone number. The keypad equivalent field of each entry or record is that station set keypad "spelling", or numeric equivalent, of the associated name, typically comprised of a surname, given name and middle initial. Each of the keypad digits 2 to 9 is used to represent several different letters of the alphabet. An A, B, or C is represented by "2", a D, E, or F is represented by a "3", and so forth in the usual fashion. Since the letters Q and Z are not shown on the standard telephone keypad they are represented by the digits 7 and 9, respectively. Thus, for example, the keypad equivalent spelling of the name "Szeto" is "79386" (FIG. 3).

The arrangement forms a new sequence of digits upon receiving each keypad spelling entry by adding each received entry to the previously formed sequence. It is recognized that upon receiving the first keypad spelling entry the sequence contains only one digit or character. Thereafter, the sequence expands as each entry is received and added to the prior sequence of entries. Upon forming a new sequence, the arrangement compares the new sequence against a leading substring of each keypad equivalent field contained in the directory. When a match is made, the arrangement in accordance with the invention, returns the corresponding information (surname and given name or surname and initials and telephone number) to the calling station set. Assume, for example, that the sought-after name if Paul G. Berkowecz. Thus, the first digit inputted by the user is a 2, which represents A, B and C. As seen from FIG. 3, the first substring that matches the sequence comprising the digit 2 in the keypad equivalent field is the first entry in the directory. Thus, the program displays "Ahluwal, Hardin 3329" on display module 210. Upon receiving the next digit, which for this example is the digit 3, the invention displays on module 210 the entry associated with the next matching substring 23, which in this example is the entry "Derkowecs, Freder 3728". This last entry is displayed by the program upon receiving each of the additional inputs of 7569329 since the substring 237569329 matches the keypad equivalent substring associated with Berkowecz. The digit 0 (zero) shown in the keypad equivalent field is used to distinguish either commas (,) or spaces that may be present in the spelling or a name. Upon receiving the digit 7 following the reception of the digit 0 the program matches the keypad equivalent substring associated with the entry of Paul G. Berkowecz, the sought after name.

Figure 4:
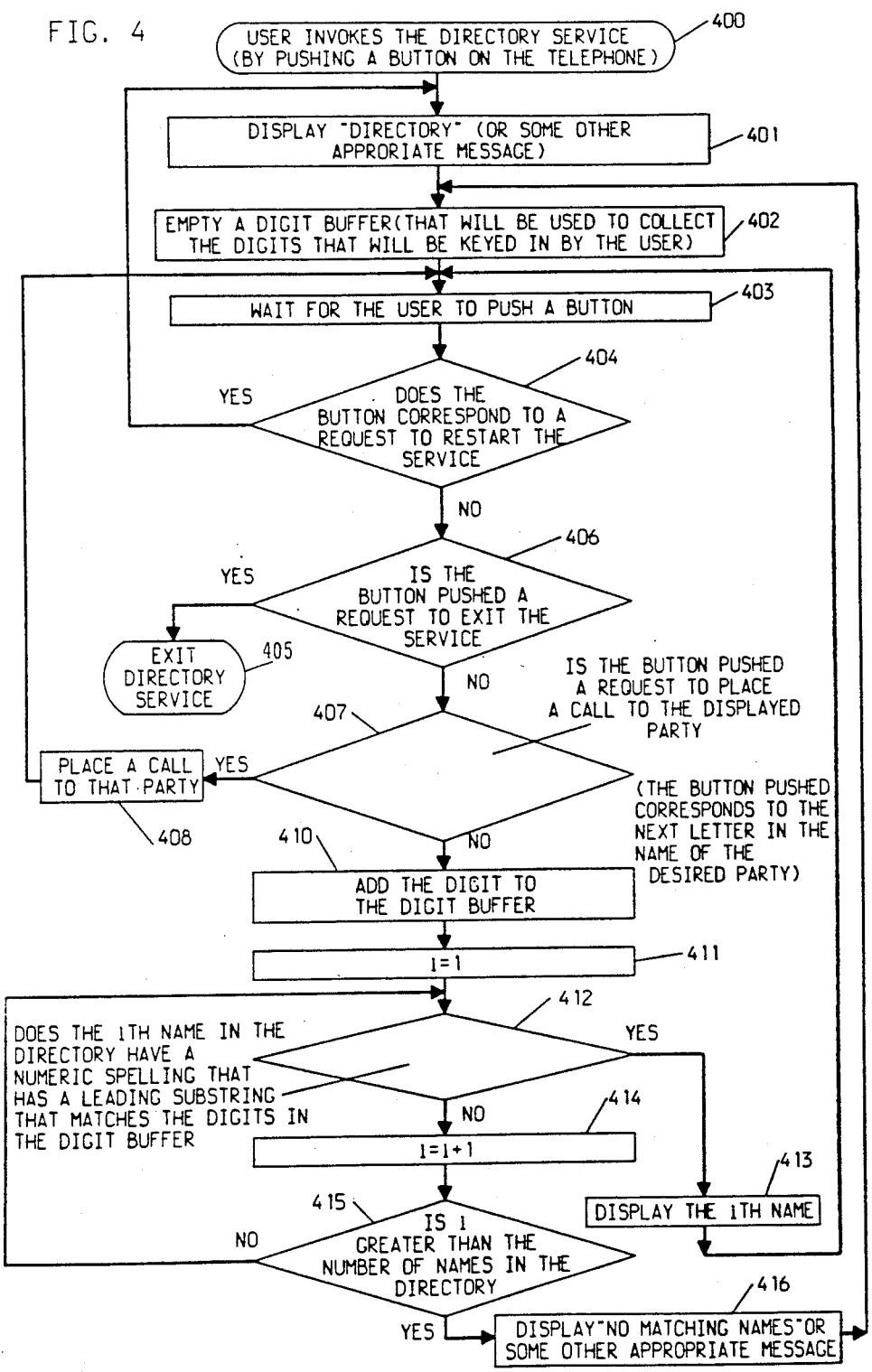
FIG. 4 is a flow chart detailing the operation within the system of FIG. 1 of a directory assistance program embodying the principles of the invention.

Referring now to FIG. 4, there is shown the software program process stored in memory 104 which, as in the above example, searches the stored directory for a sought after name and telephone number as it is inputted via a station keypad and causes names and numbers to be displayed on display module 210. The program operation starts at block 400 when it is invoked by the operation of the DA button (FIG. 2). The user can do this without picking up the station set handset or while a call is in progress. As indicated at block 401, the program displays an appropriate message or feature name, such as "DIRECTORY", at the invoking station set.

At block 402, the program clears a memory digit buffer (not shown) into which the program will store the digits (corresponding to the letters of the name) received from the calling station. Upon clearing the buffer, the program waits at block 403 for the user to input a station set keypad button signal. Upon receiving the keypad signal the program tests the input at decision block 404 to determine whether the user requested a restart of the program. The user may request a restart of the program at any point in the dialing sequence by operating the DA button. A request to restart causes the program to transfer to block 401 and display the feature name at the requesting station.

If the decision at block 404 is negative, the program falls through to block 406, at which point the program tests the input to determine whether the user request is a request to exit from the program via block 405. Otherwise, the program falls through to block 407. At block 407, the input received from the calling station is again tested to determine if the request corresponds to a request to dial the telephone number displayed at that station. In the event of such a request, the program transfers to block 408, at which point the station set is connected through system 100 by call processor 103 to the displayed telephone number. Upon completing this task, the program transfers to block 403 to await the next user input. If the request is not to place a call to the displayed number, the program falls through to block 410.

The program, at block 410, assumes that the input received from the calling station corresponds to a keypad digit and it appends the received digit to a (possibly empty) string of digits stored in the digit buffer. For the first pass through block 410, only one digit (representation of a group of letters) is stored in the digit buffer. The number of digits stored in the digit buffer then increases during succeeding passes through block 410.

The portion of the program from block 411 to block 416 is the logic that enables the program to match the digits inputted to that point with a leading substring of digits stored in the keypad equivalent field of a record of the stored directory. As mentioned above, the digits stored in each record of the directory comprise a numerical spelling of a name stored therein. The program considers each numeric spelling (keypad equivalent) in the directory and tests to see if a particular one of them, or a portion thereof, matches the sequence of digits that have been collected and stored in the digit buffer thus far.

Initially, at block 411 the program sets a directory index i=1. At block 412 the program checks to determine if the i$^{th}$ numerical spelling in the directory (initially the first name in the directory) has a leading substring that matches the digits stored in the digit buffer. If there is a match, the program transfers to block 413 where the adjacent information fields containing the alphabetic spelling of the name and telephone number are extracted from the directory and displayed at the station set. Upon completing this task, the program transfers to block 403 to await for the next inputted stimulus, which could be a request to place a call, a request to exit, or another digit to be collected and added to the those inputted thus far.

Returning to block 412, if the decision thereat is negative, the program falls through to block 414 where the directory index 1 is increased by 1. At block 415, the directory index is tested to determine whether its value exceeds the number of names or entries stored in the stored directory. If it is, an appropriate message is transmitted to the station at block 416 and the program transfers to block 402. Otherwise, the program transfers to block 412 where the program performs the comparison discussed above and so forth, until either a match is made or the last entry is encountered.

It will be apparent to those skilled in the art that the invention disclosed herein is not limited to the embodiment disclosed in the accompanying drawing and foregoing detailed description, but can be rearranged through the substitution, addition and/or deletion of components and functions without departing therefrom.

For example, the program can be modified to speed up the search of the directory by using the first inputted digit (2-9) as an index. Thereafter, the index can be used to limit the search to only those entries having keypad spellings that start with the initial entry. For example, if the first keypad letter equivalent is a 6, which represents all names starting with either the letter M, N or O, then that portion of the directory below the first entry beginning with the letter M (or keypad equivalent 6) can be ignored, i.e., all names beginning with any of the letters A through L. This can be readily accomplished at, for example, block 411 by testing the digit buffer to determine if any inputted digits have been stored in the buffer. If more than one digit is stored in the buffer, the program fetches a previously stored directory index, sets i equal to that index and proceeds to block 412. If only one digit is stored in the buffer the program tests that digit to see if it is within the range of 2 to 9. If the test is within that range, the program translates the first inputted digit into a directory index, stores the index, sets i equal to the index and then proceeds to block 412. Otherwise, the input could be considered invalid, causing the program to proceed to block 401. Alternatively, the program could set the index to 1 and proceed to search the directory starting with the first entry. The index could also be used to eliminate from consideration the portion of the directory following the last name starting with M, N or O. In this case, the test in block 415 would compare the value of i to the value of a stored index.

The program shown in FIG. 4 as well as the program shown in FIGS. 5 and 6 discussed below, can be readily modified to provide forward and backward scrolling using either the star (\*) button or the pound (#) button as inputs, respectively. For example, this can be accomplished as shown in FIG. 7 in which the input is compared to \* at block 700 and # at block 702, if either comparison is true, index i is incremented at block 701 or decremented at block 703 accordingly. The revised index is tested at block 704 to determine that it is within the bounds of the directory. If the index is valid, the program transfers to block 413. If the index is not within the bounds of the directory, then the program proceeds to block 416.

Figure 8:
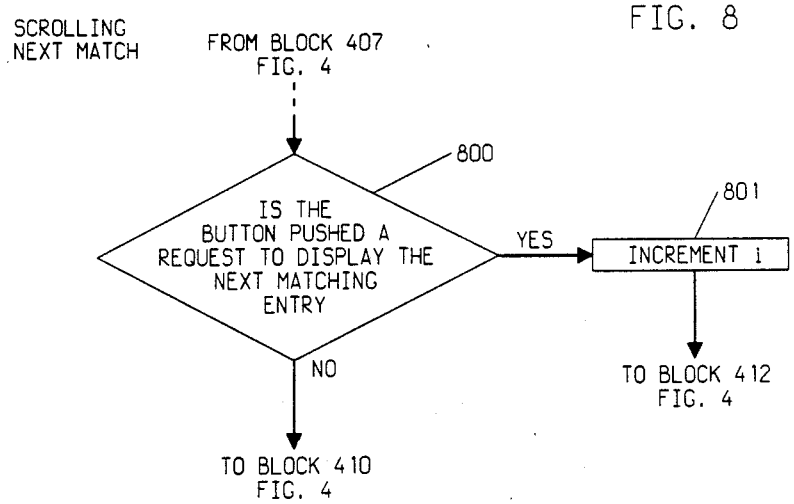

Alternatively, the star (\*) button could be used to direct the program to the next entry in the directory that matches the digits contained in the digit buffer. For example, if the digits contained in the digit buffer are "22" and the first entry associated with the name "Abbot" is displayed, then the star button would direct the program to display the next matching name, such as "Cabot". This can be accomplished as shown in FIG. 8 in which the illustrated program is positioned between program blocks 407 and 410 of FIG. 4. At block 800, the program tests the input to determine if it corresponds to star (\*) button signal. If the test is negative, the program falls through to block 410. Else, if the test is positive, the program increments the index i and proceeds to block 412.

In addition, a timing sequence could be readily added to block 403 which causes the program to automatically exit in the event the user fails to input a character within a specific period of time, for example, 10 seconds.

BINARY SEARCH PROGRAM

Figure 5:
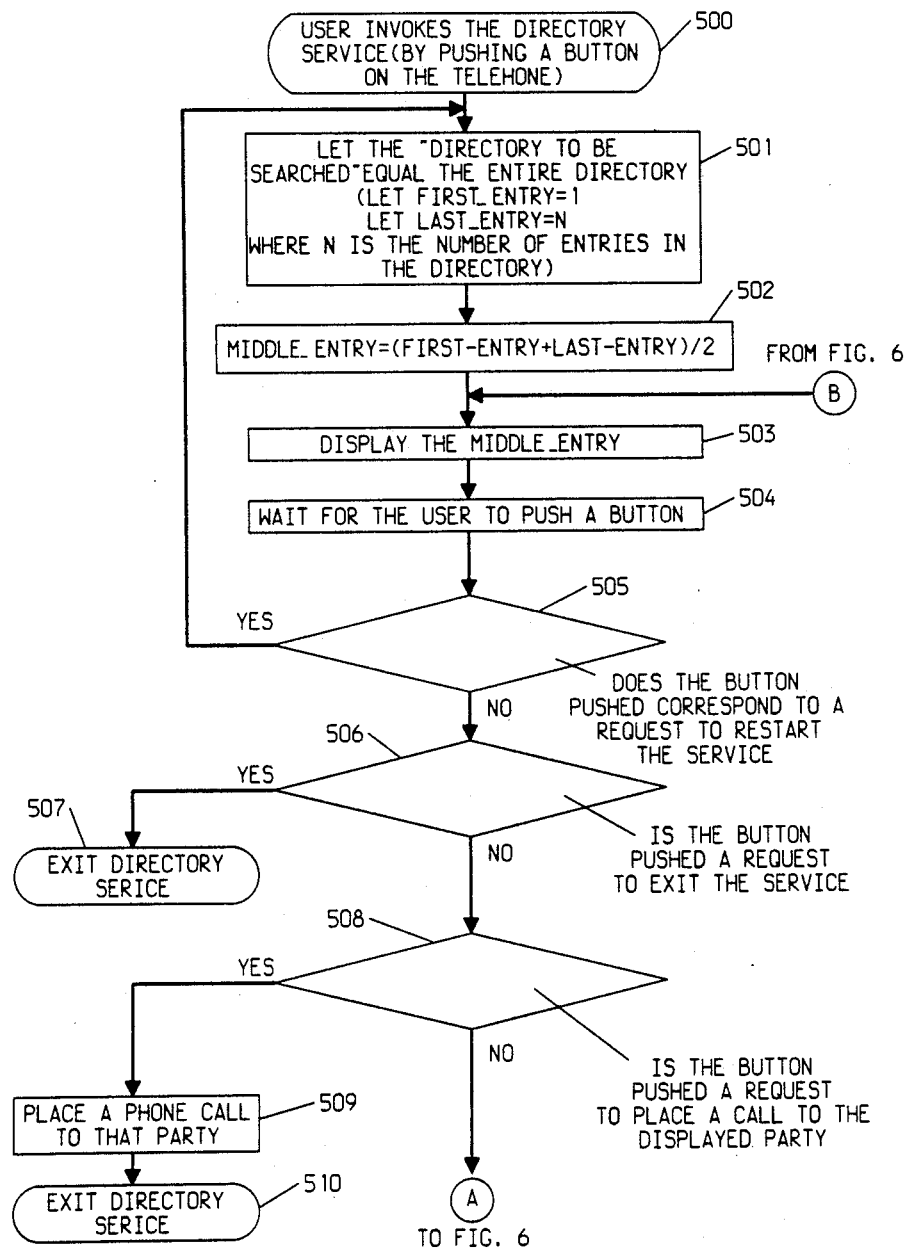
FIGS. 5 and 6 are flow charts detailing an alternative directory assistance program.
Figure 6:
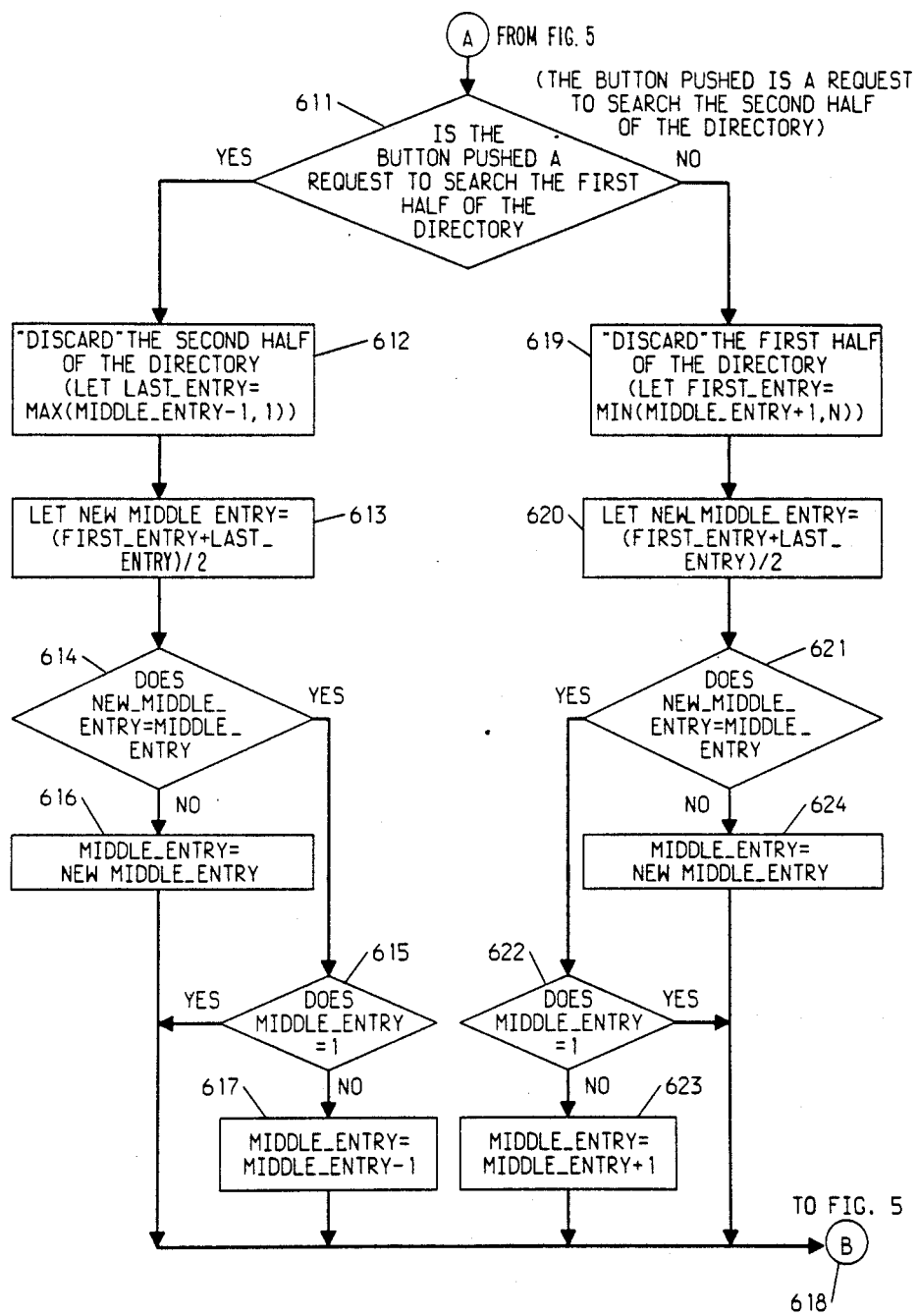
Figure 7:
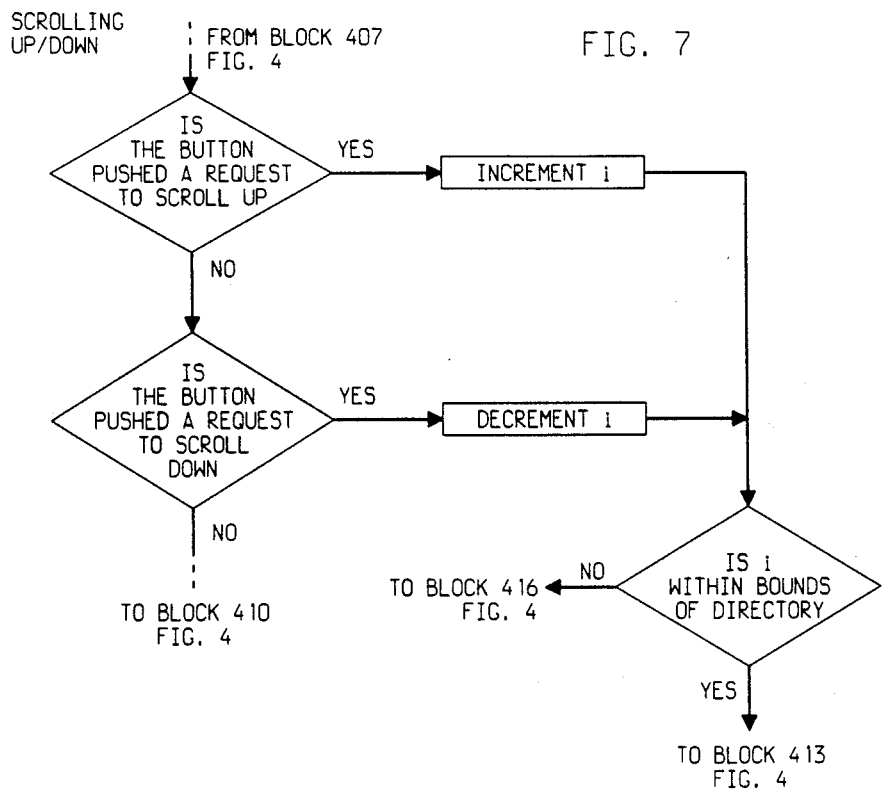
FIGS. 7 and 8 are flow charts detailing a directory scrolling program that can be used in conjunction with the program flow chart shown in FIG. 4.

Another type of directory searching program, referred to as a binary search oriented service, is shown in FIGS. 5–6. When the binary search oriented service is invoked, it displays at the calling station set the middle entry contained in the stored directory. For example, assuming that Miles, Louis E. (FIG. 3) is the middle entry, then that name and extension number 3209 are displayed at the invoking station. Upon completing this task the program awaits direction from the station set user. The user has the option of either directing the program to search the first half of the directory, i.e., those entries preceding the displayed entry, or to search the second half of the directory, i.e., those entries following the middle entry. This direction is inputted by the user by operating either the #1 button or the #2 button of keypad 201, respectively. If the user operates the #1 button, the service disregards the entries following "Miles" and displays at the user's station set the middle entry in the remaining directory, which might be "Feiner, A.—3290". If the sought-after name alphabetically follows Feiner the user operates the #2 button of keypad 201. In response, the directory assistance program displays at the user's station set via display module 210 the middle entry between the Feiner entry and the Miles entry. Thus, the program repetitively splits the directory into smaller portions and repetitively displays an entry at each level of the splitting process, all under control of the invoking user.

Referring to FIG. 5, there is shown the program in flow chart form detailing the logic for searching the directory in a binary oriented fashion. Upon being invoked, the program displays at the invoking station the name and telephone extension contained in the middle of the directory. The program tracks two variables identified as the "first entry to be considered" and "last entry to be considered" corresponding to the first and last entries contained in the directory.

As the search proceeds, the program repetitively focuses on a smaller portion of the directory under control of the user until the sought after name and telephone number is located. This is accomplished by changing the values of the two variables mentioned above.

At block 500, the program is invoked when the DA button on a station set is operated by the user. The binary oriented directory search program is shown in flow chart form in FIGS. 5 and 6, in which FIG. 6 is a continuation of FIG. 5. At block 501 the variables firstentry and lastentry are initialized to 1 and n, respectively, where n is the number of entries contained in the directory.

At block 502, the middleentry in the directory is determined. At block 503 the name and telephone number of the middle entry is returned to the invoking station and is displayed at that station via display module 210.

At block 504, the program waits for the reception of a command to be inputted by the calling or invoking station. Blocks 505 to 510 are logic steps that check and process requests to restart or terminate the service.

At block 505 the program tests the user inputted command to determine if the request is to restart the program. If it is, the program transfers to block 501 in order to redisplay the middle entry in the original directory, otherwise the program proceeds to block 506. At block 506, the program tests the inputted command to determine if the command is a request to exit the directory service program. If this test is affirmative, the program exits via block 507, otherwise the program proceeds to block 508.

At block 508, the program tests the inputted command to determine whether the user wishes to place a call to the telephone number that is currently displayed at the user's station set. If the test is affirmative the program transfers to block 509, at which point the system establishes a connection between the invoking telephone number and the displayed telephone number. Upon completing this task, the program exits via block 510. If the test performed at block 508 is negative the program falls through to block 611 (FIG. 6).

It is recognized that the entry inputted by the user may be an invalid request and that an entry could be readily verified as to its validity by inserting the appropriate logic steps within the logic sequence between blocks 505 and 611.

Referring now to FIG. 6, at block 611 the program tests the inputted command to determine if the command is a request to seach the first half of the directory. That is, a request to search the names in the directory coming before the middle entry, in which case the program proceeds to block 612, or to search the names following the middle entry, in which case the program proceeds to block 619.

It is to be recognized that the logic steps consisting of block 612 to block 617 are similar to the logic steps consisting of block 619 to block 624 and that both branches of the program can be readily meshed into one branch with the addition of appropriate logic steps to distinguish the search performed by each branch. The program was coded in compliance with the flow chart shown in FIGS. 5 and 6 using the C-programming language.

If the user wishes to search the first half of the directory (or portions thereof), the program, (at block 612) sets "lastentry" to "middleentry−1", effectively discarding the last half of the directory. Alternatively, if the user wishes to search the last half of the directory, the program discards the first half by setting "first entry" equal to "middleentry+1" (block 619). The "max" function in block 612 and the min function in block 619 insure that the new boundary is at least 1 and at most n (the number of entries in the original directory) so that the program never searches beyond the bounds of the original directory.

In block 613 (and block 620), the program determines the "newmiddleentry", that is, the middle entry of the remaining phonebook. If "newmiddleentry" is not equal to "middleentry" (blocks 614 and 621), "middleentry" is assigned the value of "newmiddleentry" (in blocks 616 and 624) and the program returns to block 503 where the new "middleentry" is displayed. At this point, the user can continue the search or take any of the other actions described above in connection with blocks 505-510.

As the user continues the search, discarding the first half of the (remaining) directory in some cases and the second half in others, the directory to be searched will shrink in size. At some point, the desired party will be displayed, perhaps because it is the only entry in the remaining directory. (Since half the entries are removed at each step, this will take at most log(n) steps, where n is the size of the original directory and the base of the logarithm is 2.)

When the remaining phonebook gets sufficiently small, the value of "newmiddle-entry" (computed in blocks 613 and 620) may turn out to be the same as that of "middleentry". When this occurs, the program either decrements or increments "middleentry", (based on the user's request for a name before or after the displayed name (blocks 615 and 622)) to avoid displaying the same name for successive requests. As above, after "middleentry" has been determined, the program returns to block 503, the new "middleentry" is displayed and the program waits for another input from the user. Note, that when the directory is sufficiently small, the user can step through the entries in the directory, one entry at a time. Note too, that logic is included (in blocks 615 and 617 and 622 and 623) so that the program never searches beyond the bounds of the original phonebook.

What is claimed is:

1. An arrangement for providing directory information at a telephone station set having a plurality of keypad buttons operative for causing the generation of respective keypad signals, each of said signals corresponding to an individual character, said arrangement comprising, a stored directory for storing a plurality of records, each of said records including an information field and a string of characters, means responsive to receipt of each signal of a sequence of said keypad button signals for forming a sequence of characters comprising the character corresponding to the received signal and the characters respectively corresponding to each previously received signal, and means responsive to each said sequence of characters for transferring to said station set the information field of one of said records having a string of characters matching said each sequence of characters.

2. The invention set forth in claim 1 wherein said information field includes the telephone number of an associated telephone station set.

3. The invention set forth in claim 1 wherein said string of characters is a group of digits.

4. The invention set forth in claim 1 wherein said arrangement further includes means for invoking the operation of said directory information arrangement upon receiving a starting signal from said telephone station set.

5. The invention set forth in claim 2 wherein said arrangement further includes means for initiating a telephone call to said telephone number.

6. The invention set forth in claim 1 wherein said arrangement further includes scrolling means responsive to scrolling signals received from said station set for transferring to said station set the information field of a record stored in said directory adjacent to the record having said matching string of characters.

7. The invention set forth in claim 6 wherein said station set scrolling signals include a first signal and a second signal for directing said scrolling means to one of said records preceding or following said record having said matching string of characters, respectively.

8. The invention set forth in claim 6 wherein said scrolling means includes means for transferring to said station set the information field of a next one of said records having a string of characters matching said sequence of characters.

9. An arrangement operative for accessing directory information from a telephone station set having a keypad, said keypad having a plurality of buttons each operative for causing the generation of an individual one of a plurality of keypad button signals, each of said signals corresponding to an individual character, each of said signals corresponding to an individual character, comprising memory means for storing a plurality of records, each of said records including an information field and a group of characters, means responsive to receipt of each signal of a sequence of said keypad button signals for forming a sequence of characters comprising the character corresponding to the received signal and the characters respectively corresponding to each previously received signal, means responsive to each said sequence of characters for transferring to said station set the information field of one of said records having a string of characters matching said each sequence of characters, means for generating scrolling signals at said station, and means responsive to said scrolling signals for supplying to the station set the information field of a record adjacent to said record having said matching string of characters.

10. The invention set forth in claim 9 wherein said arrangement further includes means for invoking the operation of said arrangement upon receiving a starting signal from said station set.

11. The invention set forth in claim 9 wherein said supplying means includes means for supplying to said station set the information field of a stored record preceding or following the stored record having said string of characters matching said sequence of characters.

12. The invention set forth in claim 11 wherein said scrolling signals includes a first scrolling signal for directing said supplying means to supply said preceding record and a second scrolling signal for directing said supplying means to supply said following record.

13. The invention set forth in claim 9 wherein said information field includes the telephone number of a telephone station set.

14. The invention set forth in claim 9 wherein said station set includes a display module.

15. A directory information retrieval system accessible at a station set to obtain particular directory information, said station set having a plurality of keypad buttons for causing the generation of respective keypad signals, each of said button signals corresponding to an individual character, said system comprising station set means for generating a special signal corresponding to punctuation contained in a group of said characters, data storage means having a plurality of memory locations for the storage of a plurality of records, each of said records including an information field and a group of characters, means responsive to receipt of each signal of said keypad signals and said special signal for forming a sequence of said corresponding characters and punctuation, and means responsive to each said sequence of characters and punctuations for searching said data storage means and transferring to said station set the information field of a record having a string of characters and punctuation matching said sequence.

16. The invention set forth in claim 15 wherein said system includes scrolling means responsive to scrolling signals received from said station set for transferring to said station set the information field of a record contained in said storage means adjacent to the record having said matching string of characters and punctuation.

17. The invention set forth in claim 16 wherein said scrolling signals include a signal for directing said scrolling means to another record having a string of characters matching said sequence of characters and punctuation.

18. A method for automatically providing directory assistance at a station set having a plurality of buttons each operative for causing the generation of respective keypad signals, each of said signals corresponding to an individual character, said method including the steps of storing in memory a plurality of records, each of said records including an information field and a string of characters, receiving each signal of a sequence of said keypad button signals, forming a sequence of characters comprising the character corresponding to the received signal and the characters respectively corresponding to any previously received signals, and searching said memory upon forming each said sequence of characters and transferring to said station set the information field of a record having a string of characters matching said sequence of characters.

* * * * *